United States Patent Office 3,644,287
Patented Feb. 22, 1972

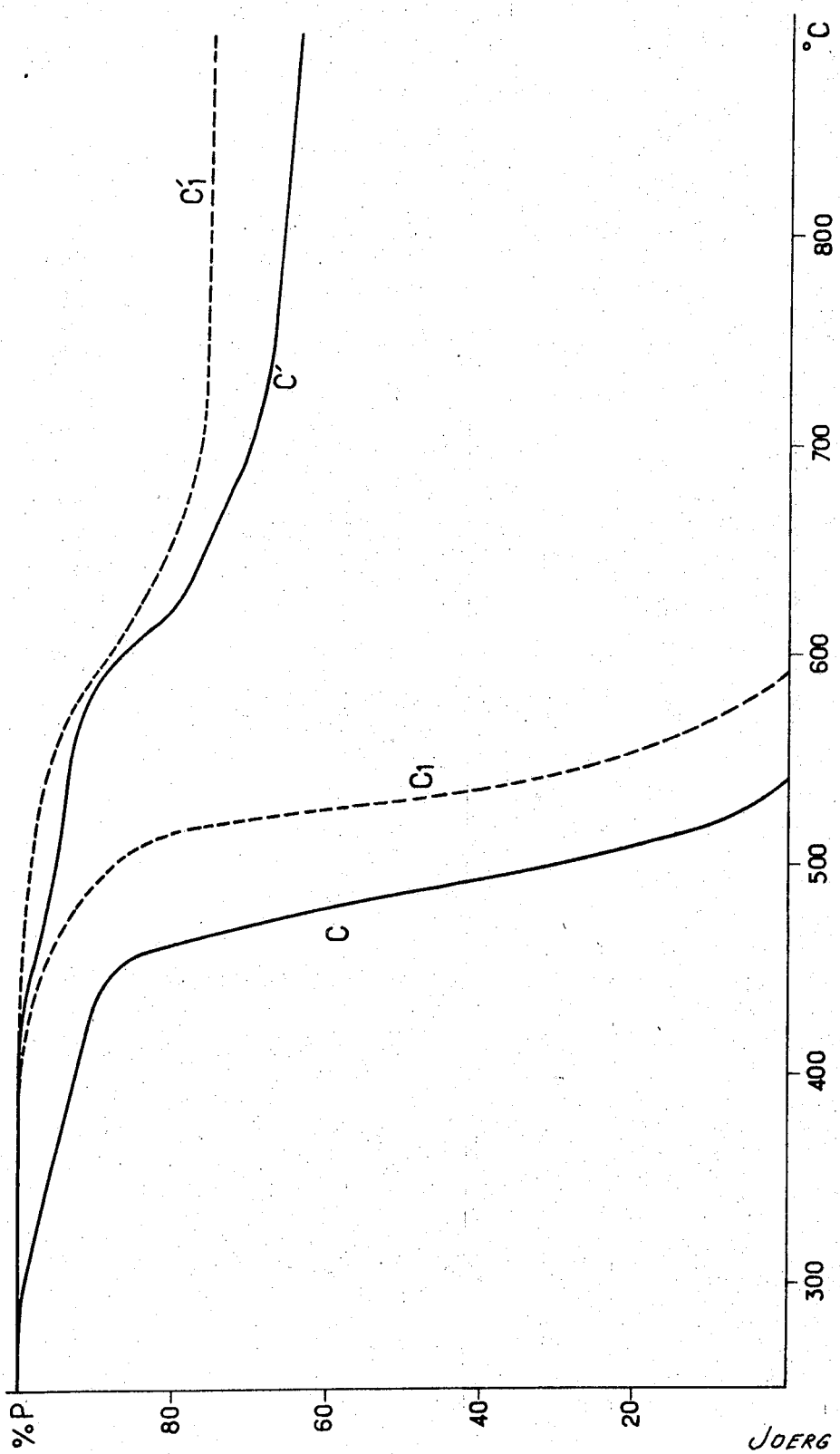

3,644,287
METHOD OF PREPARING RETICULATED
POLYBENZOXAZOLE
Jean Odier, Antony, France, and Joerg Sambeth, Carouge, Geneva, and Friedrich Grundschober, Confignon, Geneva, Switzerland, assignors to Societe Anonyme Francaise du Ferodo, Paris, France
Filed June 5, 1968, Ser. No. 784,960
Claims priority, application France, June 5, 1967, 109,042
(Filed under Rule 47(a) and 35 U.S.C. 116)
Int. Cl. C08g 33/02
U.S. Cl. 260—47 CP         7 Claims

ABSTRACT OF THE DISCLOSURE

Reticulated polybenzoxazole comprising divalent and trivalent aliphatic or aromatic radicals, substituted or not, or a plurality of aromatic radicals bound to each other either directly or by at least one of the radicals selected from the group comprising the alkyl, dioxy-alkyl, cyclanilidenes, —S, —SO$_2$—, —O—, —CO-radicals, said divalent radicals and said trivalent radicals being coupled together by the structure:

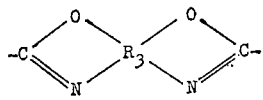

in which $R_3$ is a tetravalent radical which may be an aromatic radical, substituted or not, or a plurality of said aromatic radicals bound together directly or by at least one of the radicals selected from the group cited above, the ratio of the trivalent radicals to the divalent radicals being comprised between 1:20 and 1:1 and preferably between 1:20 and 1:5. The reticulated polybenzole can be produced in the form of shaped or moulded objects. The method of preparation comprises essentially a gradual heating of a reticulated alkoxyl polyamide mixed with pyridine hydrochloride in excess and brought up to a temperature between 180° and 220° until the cyclization is complete.

The present invention has for its object to provide new condensation products and elements, and a method for their preparation. More particularly, the invention relates to reticulated polybenzoxazole and its manufacture.

As regards the polymers which comprise benzoxazole nuclei in their main chains, there are at present only known the linear polybenzoxazoles. While these polymers are non-meltable, thermo-stable and insoluble in organic solvents, they do not entirely correspond to the requirements of certain applications.

It is an object of the present invention to provide reticulated polybenzoxazoles, and more particularly aromatic polybenzoxazole having properties superior to those of linear polybenzoxazole, especially very good stability under heat and more particularly in an oxidizing atmosphere, total insolubility in all solvents and high resistance to attack by chemical products.

It is a further object of the present invention to provide shaped objects and coatings constituted by reticulated polybenzoxazole, which lend themselves to all applications at high temperatures, and more particularly as electrical insulators and as binders in composite objects of all kinds.

Another object of the present invention is to provide a method of manufacture of reticulated polybenzoxazole from reticulated alkoxyl polyamides.

The reticulated polybenzoxazole according to the invention comprises divalent radicals $R_1$ and trivalent radicals $R_2$ which may be aliphatic or aromatic radicals, substituted or not, or a number of aromatic radicals bound to each other either directly or by at least one of the radicals selected from the group comprising the alkyl, dioxy-alkyl, cyclanilidenes, —S—, —SO$_2$—, —O—, —CO—, radicals, the said divalent radicals and the said trivalent radicals being bound together by

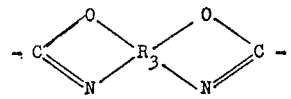

in which $R_3$ represents a tetravalent radical which may be an aromatic radical, substituted or not, or a number of these radicals bound together directly or by at least one of the radicals selected from the group comprising the alkyl, dioxy-alkyl, cyclanilidenes, —S—, —SO$_2$—, —O—, —CO— radicals, the ratio of the trivalent radicals to the divalent radicals being comprised between 1:20 and 1:1, and preferably between 1:20 and 1:5.

The method of manufacture of reticulated polybenzoxazole according to the invention consists of heating gradually to a temperature between 180 and 220° C., for the time necessary to obtain complete cyclization, at least one recticulated alkoxyl polyamide comprising alphatic and/or aromatic radicals $R_1$ and $R_2$ associated by the relation:

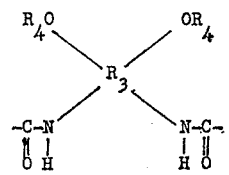

in which $R_1$, $R_2$ and $R_3$ have the same meaning as above, $R_4$ being an alkyl or aryl radical substituted or not, each $OR_4$ group being directly fixed on a carbon atom of the radical $R_3$ in the ortho or para position with respect to the carbon atom on which the amide group is fixed, with pyridine hydrochloride or one of its homologues in excess, and then heating the product obtained to a temperature exceeding 220° C. in order to eliminate the excess of pyridine hydrochloride.

This reticulated polyamide is obtained following the method described in detail in copending application Ser. No. 784,959 filed under even date herewith which consists of reacting together a compound of an aromatic dialkoxyl diamine, a compound of dicarboxylic acid and a compound of tricarboxylic acid. This reaction may be carried out by poly-condensation in fusion of a dialkoxyl diamine with a diester of dicarboxylic acid and a triester of tricarboxylic acid, or of a di-isocyanate corresponding to the said dialkoxyl diamine with the dicarboxylic and tricarboxylic acid themselves. It may also be effected by polycondensation in solution or by interfacial polycondensation of a dialkoxyl diamine with halogenides.

In greater detail, the reticulated polyamide of the above-identified copending application comprises divalent radicals $R_1$ and trivalent radicals $R_2$ which may be aliphatic or aromatic radicals, substituted or not, or a number of aromatic radicals bound to each other either directly or by at least one of the radicals selected from the group comprising the alkyl, dioxy-alkyl, cyclanilidenes, —S—, —SO$_2$—, —O—, —CO— radicals, the said divalent radicals and the said trivalent radicals being coupled to each other by the structure:

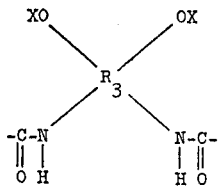

in which $R_3$ represents a tetravalent radical which may be an aromatic radical, substituted or not, or a number of aromatic radicals coupled together directly or by at least one of the radicals selected from the group comprising the alkyl, dioxy-alkyl, cyclanilidenes, —S—, —SO$_2$—, —O—, —CO— radicals; X representing hydrogen or at least one of the three radicals:

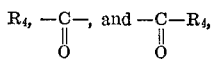

in which $R_4$ represents an alkyl or aryl radical, and in which each OX group is fixed directly on a carbon atom of the tetravalent radical in the ortho or para position with respect to the carbon atom on which is fixed the amide group —NHCO—, the ratio of the trivalent radicals to the divalent radicals being comprised between 1:20 and 1:1, and preferably between 1:20 and 1:5.

The method of preparation of reticulated hydoxyl or alkoxyl polyamide consists in causing the reaction of:

(a) at least one compound of diamine having the formula:

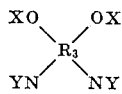

in which $R_3$ and X have the same meaning as above, Y representing two hydrogens or, when X is not hydrogen, the radical =C=O, and in which each NY group is fixed directly on a carbon atom of the radical $R_3$ in the ortho or para position with respect to the carbon atom on which the group OX is fixed;

(b) At least one compound of dicarboxylic acid selected from the compounds corresponding to the formula:

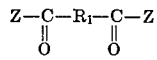

in which $R_1$ has the same meaning as above, Z representing a halogen or a group —O—$R_5$ in which $R_5$ is a monovalent radical chosen from the aromatic hydrocarbon radicals when Y represents two hydrogens, and a hydroxyl when Y represents the radical =C=O, and (c) at least one compound of tricarboxylic acid selected from the compounds complying with the formula:

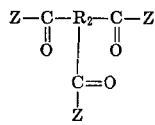

in which Z and $R_2$ have the same meaning as above, the ratio of the tricarboxylic acid compound to the dicarboxylic acid compound being comprised between 1:20 and 1:1, and preferably between 1:20 and 1:5, the number of

groups being identically the same as that of the groups —N=Y.

With regard to the diamine compound, there may be employed the hydroxyl or alkoxyl diamines or alternatively the derivatives of these latter.

As hydroxyl diamines, there will preferably be utilized the following diamines:

3,3'-dihydroxy-benzidine;
bis (3-amino-4-hydroxy)-biphenyl;
1,2-bis(3-hydroxy-4-amino-phenyl) ethane;
2,2 bis(3-hydroxy-4-amino-phenyl) propane;
bis (3-hydroxy-4-amino-phenyl);
bis (trifluoro-methyl) methane;
bis (3-hydroxy-4-amino-phenyl) ether;
bis (3-hydroxy-4-amino-phenyl) sulphide;
bis (3-hydroxy-4-amino-phenyl) sulphone;
bis (3-hydroxy-4-amino-phenyl) ketone;
bis (3-hydroxy-4-amino-phenyl) methane;
(3-hydroxy-4-amino-phenyl)-3-hydroxy-4-amino;
bis (3-amino-4-hydroxy-phenyl) ether;
bis (3-amino-4-hydroxy-phenyl) sulphide;
bis (3-amino-4-hydroxy-phenyl) ketone;
bis (3-amino-4-hydroxy-phenyl) methane;
1,2-bis (3-amino-4-hydroxy-phenyl) ethane;
2,2-bis (3-amino-4-hydroxy-phenyl) propane;
1,5-diamino-2,6-naphthalene diol;
1,6-diamino-2,5-naphthalene diol;
2,5-diamino-1,6-naphthalene diol;
2,6-diamino-1,5-naphthalene diol;
1,6-diamino-2,7-dihydroxy-naphthalene;
2,5-diamino-1,7-dihydroxy naphthalene;
1,7-diamino-2,6-dihydroxy naphthalene;
2,7-diamino-1,6-dihydroxy naphthalene;
2,7-diamino-3,6-dihydroxy naphthalene;
3,7-diamino-2,6-dihydroxy naphthalene;
1,5-diamino-4,8-dihydroxy naphthalene;
1,5-diamino-2,6-dihydroxy anthracene;
1,8-diamino-2,7-dihydroxy phenanthrene;
1,4-diamino-2,5-dihydroxy benzene;
1,3-diamino-4,6-dihydroxy benzene.

As alkoxyl diamines, there will preferably be employed the methoxyl diamines corresponding to the hydroxyl diamines recited above. With regard to the derivatives of alkoxyl diamines, there will preferably be utilized the diisocyanates of methoxyl diamines.

The choice of the compounds of dicarboxylic and tricarboxylic acids will be made according to the nature of the diamine compound utilized.

When the compound of hydroxyl or alkoxyl diamine is the diamine itself, the acid compounds are derivatives of the dicarboxylic and tricarboxylic acids, such as the dihalogenides and trihalogenides or the diesters and triesters of the said acids.

When the diamine compound is a di-isocyanate derivative of the corresponding alkoxyl diamine, the acid compounds are the acids themselves.

With regard to the compounds of dicarboxylic acid, the following acids or their derivatives will be employed: malonic acid; succinic acid; glutaric acid; adipic acid; pimelic acid; suberic acid; azelaic acid; sebacic acid; nonane-dicarboxylic acid and higher acid homologues; isophthalic acid; terephthalic acid; biphenyl-3,3'-dicarboxylic acid; biphenyl-4,4'-dicarboxylic acid; bis (3-carboxyphenyl) methane; bis(4-carboxy-phenyl) methane; 2,2-bis(3-carboxy-phenyl) propane; 2,2-bis(4-carboxy-phenyl) propane; 2,6-dicarboxylic naphthalene; bis(3-carboxyphenyl) ether; bis(4-carboxy-phenyl) ether; bis(3-carboxy-phenyl) sulphide; bis(4-carboxy-phenyl) sulphide; bis(3-carboxy-phenyl) sulphone; and bis(4-carboxyphenyl) sulphone.

As derivatives of dicarboxylic acids, there can be employed the dihalogenides or the arylic diesters, more particularly the phenolic and naphtholic diesters.

With regard to the compounds of tricarboxylic acids, there will be employed the following acids or their derivatives:

benzene-1,3,5-tricarboxylic acid (known commercially as trimesic acid);
benzene-1,2,3-tricarboxylic acid;
benzene-1,2,5-tricarboxylic acid;
biphenyl-3,4,4'-tricarboxylic acid;
biphenyl-2,3,4'-tricarboxylic acid;
biphenyl-2,4,3'-tricarboxylic acid;
biphenyl-3,4,4'-tricarboxyl sulphone;
anthracene-1,2-4-tricarboxylic acid;
naphthalene-1,2,7-tricarboxylic acid;
naphthalene-1,2,4-tricarboxylic acid;
naphthalene-1,4,5-tricarboxylic acid;
triphenyl-methane-2,2',2''-tricarboxylic acid;
bis(2-carboxy-phenyl) acetic acid.

As derivatives of tricarboxylic acids, there may be employed the trihalogenides or the arylic triesters, more particularly the phenolic and naphtholic triesters.

One manner of carrying into effect the method according to the aforesaid application consists of polycondensing, in the molten state, the diamine, the compound of dicarboxylic acid and the compound of tricarboxylic acid.

As compounds of carboxylic acid, there are chosen compounds from amongst the meltable compounds, and therefore the esters, and more particularly the phenolic and naphtholic esters of the dicarboxylic and tricarboxylic acids mentioned above.

A mixture of the starting substances is heated under agitation to a temperature and for the time necessary for the completion of the reaction.

The temperature must be above the melting point of the esters, but must not exceed 220° C. in order to prevent cyclization which might take place in certain cases.

The temperature will therefore be comprised between the melting point of the esters employed and 220° C., preferably between 200° and 220° C.

The period of the reaction depends on the degree of condensation desired. If it is desired to obtain a polymer having a large number of reactive terminal groups, the duration of the reaction will be regulated in such manner as to obtain a low degree of condensation.

The product obtained is produced in the form of a solid mass which can be reduced to powder and which lends itself to moulding.

The reaction may also be carried out directly in a mould at the temperatures indicated above, under pressures which may reach 1500 kg./sq. cm.

It is also possible to proceed in the presence of a filler substance.

When the diamine compound employed is a methoxyl di-isocyanate, the dicarboxylic acids and the tricarboxylic acids themselves will be employed as the carboxylic compounds.

In this case, the di-isocyanate, the dicarboxylic acid and the tricarboxylic acid are intimately mixed, and the mixture is heated to a temperature comprised between 150° and 250° C., preferably between 200° and 220° C., for a duration sufficient for the completion of the reaction. The poly-condensation is effected with liberation of carbon dioxide.

The reticulated polyamides may also be obtained by other methods of poly-condensation which are in general use, such as poly-condensation in solution and interfacial poly-condensation.

In the case of poly-condensation in solution, there are employed as acid compounds the di-halogenides and tri-halogenides of dicarboxylic and tricarboxylic acids, preferably the chlorides.

The starting products are caused to react in the midst of an organic solvent and in the presence of pyridine as an acceptor of the acid formed, at a temperature comprised between —10° and +50° C., and for a time which depends on the degree of polymerization desired. With regard to the solvents, there will be employed organic liquids which are inert with respect to the reactants and which have a solvent power with regard to these latter, together with a jellifying power in respect of the polymer formed. There will preferably be used dimethyl-acetamide, dimethyl-formamide, N-methyl-pyrrolidone and dimethyl-sulphoxide. The reticulated polymer forms a kind of gel which is separated from the other constituents by precipitation in water.

Interfacial poly-condensation, which is carried out with the aid of an alkali compound as an acceptor of acid, has the advantage over poly-condensation in solution of being more economical, because it employs water as the reaction medium and avoids the expensive operation constituted by the recovery of the solvent and of the organic base.

The diamine will preferably be employed in the form of hydrochloride in an aqueous solution, and the acid compounds in the form of di-halogenides and tri-halogenides of acids dissolved in a solvent which is inert with respect to the starting products.

As the solvent of the acid compounds, ketones are utilized such as cyclo-hexanone and cyclo-heptanone, or halogenated aliphatic or aromatic hydrocarbons such as chloroform and chlorobenzene.

As the alkali compound, there will preferably be used an alkali carbonate, and more particularly sodium carbonate in an aqueous solution, or calcium carbonate in an aqueous suspension, in a quantity just sufficient for the neutralization of the acid formed during the course of the reaction.

The reaction consists of vigorously stirring the aqueous solution of diamine hydrochloride and the organic solution of the compounds of dicarboxylic and tricarboxylic acids, and then progressively adding the solution or the suspension of alkali carbonate. The polymer separates out easily by precipitation.

The temperature of the reaction is comprised between —10° C. and +30° C., preferably between 0° and 10° C. The reaction takes place instantaneously.

In the various ways of carrying into effect the method according to the aforesaid application, the reticulated polyamide is obtained directly from diamine compounds, dicarboxylic and tricarboxylic acid compounds. The invention provides for an alternative form of the method, in which the diamine is first reacted with the compound of dicarboxylic acid, after which the compound of tricarboxylic acid is added in a subsequent stage of the method. This second stage can be carried out immediately following the first, or later.

According to this alternative form, one of the ways of carrying into effect the first stage of the method consists of poly-condensing the diamine in the molten state with the compound of dicarboxylic acid.

As compounds of carboxylic acids, there are chosen compounds from the meltable compounds, namely esters, and more particularly the phenolic and naphtholic esters of the dicarboxylic acids recited above.

Another way of carrying out the first stage of the alternative form of method according to the previous application consists of effecting an interfacial poly-condensation of the diamine with the dicarboxylic acid compound, with the aid of an alkali compound as an acid acceptor and water as the reaction medium.

The linear hydroxyl polyamide can also be obtained by poly-condensation in solution.

In this case, the di-halogenides of dicarboxylic acids, and preferably the chlorides are employed as the acid compounds.

The product obtained in the form of a solid meltable mass, soluble in a certain number of organic solvents, can be powdered and lends itself to moulding; it is a hydroxyl polyamide having a terminal group $NH_2$ at each of the extremities of the chain and two —OH groups in each of its structural units.

The amide constitution of the polymer is clearly brought out by the absorption bands at 3420 and 1670 cm.$^{-1}$ shown by their absorption spectrum in the infra-red.

The linear nature of the polymer is clearly shown by its meltability and its solubility in a certain number of organic solvents, and more particularly dimethyl-acetamide, dimethyl-sulphoxide and N-methyl-pyrrolidone.

One manner of carrying into effect the second stage of the alternative form of the method according to the previous application consists of reticulating the linear hydroxyl polyamide obtained during the first stage of the process. Reticulation is effected by poly-condensation in the molten state of the said linear polyamide with a compound of tricarboxylic acid.

As compounds of tricarboxylic acid, there are chosen compounds taken from the meltable compounds, namely esters, and more particularly phenolic and naphtholic esters of the tricarboxylic acids mentioned above.

The reticulation is effected, on the one hand by virtue of the terminal $NH_2$ groups of the linear polyamide, with formation of amide bonds, and on the other hand by means of the OH groups comprised in each of the structural units, with formation of ester bonds. All the OH groups do not react and the polymer obtained is a reticulated hydroxyl polyamide containing ester groups.

The mixture of linear polyamide and ester of tricarboxylic acid is heated while stirring to a temperature and for the time necessary for the completion of the reaction.

The temperature will be higher than the melting point of the esters but must not exceed 220° C. so as to avoid cyclization which could take place in certain cases. The temperature will therefore be comprised between the melting point of the esters employed and 220° C., preferably between 200° and 220° C.

The product is obained in the form of a solid mass which can be powdered and lends itself to moulding.

This reaction during the second stage can also be carried out in a mould, in which there is introduced a mixture of linear polyamide and ester of tricarboxylic acid. The procedure is carried out at the temperatures indicated above and at pressures which may reach 1500 kg./sq. cm. It is also possible to proceed in the presence of a filler substance.

The reaction is carried out more readily when the molecular weight of the linear polyamide is lower. In consequence of its low viscosity, the linear polyamide with a low molecular weight lends itself particularly well to direct reaction inside the mould.

As already indicated above, the second stage of the alternative form of method according to the previous application can be carried out immediately following the first, or subsequently.

It is possible to add filler substances of any kind, mineral or organic to the polyamide before it is shaped. Organic fillers can play the part of plastifying agents.

As an example of the preparation of a reticulated polyamide according to the aforementioned application, the following is given:

A mixture of 44.97 grams (0.208 mol.) of dihydroxybenzidine, 59.7 grams (0.1875 mol.) of phenolic diester of isophthalic acid and 5.97 grams (0.0136 mol.) of phenolic triester of trimesic acid is heated while stirring to 200° C. under vacuum. There is formed a molten mass which is separated from the phenol formed by distillation. The heating is stopped after 40 minutes (counting from complete melting) and the product is cooled. There is obtained a solid mass which is reduced to powder and treated several times with ethanol to eliminate the unreacted ester and the phenol. The product is then washed with dilute hydrochloric acid to eliminate all traces of dihydroxy-benzidene and is then rinsed with water until it is neutral. The yield is 94%. The polymer obtained is insoluble in all organic solvents and also in sulphuric acid, which indicates the reticulated nature of the polymer. Its polyamide structure is indicated by its infra-red spectrum (bands at 3420 cm.$^{-1}$ and 1670 cm.$^{-1}$).

This polyamide may also be manufactured by an alternative form of the above method, which consists, in a first stage, of preparing a linear polyamide of low molecular weight from a dialkoxyl diamine and a compound of dicarboxylic acid or from a dialkoxyl di-isocyanate and a dicarboxylic acid, and then in a second stage, of reticulating this linear polyamide by the addition of a triester of tricarboxylic acid.

The polyamide obtained is produced in the form of a solid insoluble mass which can be reduced to powder, or in the form of shaped objects obtained either from this powder or directly during the course of the poly-condensation reaction.

As reticulated alkoxyl polyamides, there will be employed all those recited in the copending application referred to above.

There will preferably be utilized the alkoxy polyamides obtained from the following monomers:

As diamine compounds, the diamines:
    3,3'-dimethoxy-benzidine,
    1,4-dimethoxy 2,5-diamino-benzene
or the corresponding di-isocyanates.

As compounds of dicarboxylic acids:
    The phenolic or naphtholic diesters or the dichlorides of the following acids:
        Isophthalic acid,
        Terephthalic acid,
        Sebacic acid,
        Adipic acid,
        or the acids themselves.

As compounds of tricarboxylic acids:
    The triesters or the trichlorides of the following acids:
        Trimesic acid,
        Trimellic acid,
        or the acids themselves.

With regard to the pyridine hydrochloride or homologue of the pyridine, there will be utilized pure pyridine hydrochloride, or the product of technical quality containing in addition hydrochlorides of homologues of pyridine, in particular hydrochlorides of picolines, lutidines and collidines. Instead of the hydrochloride of pyridine, it is also possible to utilize a hydrochloride of picoline, a hydrochloride of lutidine or a hydrochloride of collidine or a mixture of these.

The pyridine hydrochloride, alone or mixed with hydrochloride of picoline, lutidine or collidine will be added to the reaction medium in the form of powder or in solution in an appropriate solvent such as chloroform which will then be eliminated by evaporation.

The pyridine hydrochloride acts simultaneously as a catalyst for the cyclization reaction and as a reactant in the breaking of the ether bond of the alkoxyl polyamides, with liberation of alkyl chloride and pyridine, enabling the cyclization reaction to take place.

There will be employed a quantity of pyridine hydrochloride in excess with respect to the stoichiometric quantity required by the breaking of the ether bond.

The reticulated alkoxyl polyamide powder is mixed with the pyridine hydrochloride and the mixture formed is then heated to a temperature between 180 and 220° C. This temperature is maintained for the time necessary to obtain complete cyclization which time may vary, depending on the starting products and the temperature of the reaction, between 1 and 3 hours, after which the excess of pyridine hydrochloride is evaporated by heating to a temperature higher than 220° C.

The cyclization reaction is carried out under a normal atmosphere. It is preferably effected after the mixture of polyamide and pyridine hydrochloride has been given the form of a shaped object, for example in a mould, in the presence of a filler, if so desired.

When it is desired to prepare oneself the starting product, namely to reticulated polyamide, it is obviously possible to follow the preparation of this immediately by its conversion to reticulated polybenzoxazole. This procedure may be advantageous when the preparation of the reticulated polyamide is effected by poly-condensation in the molten state. In fact, in this case, the conversion of the reticulated polyamide to reticulated polybenzoxazole can be effected in a continuous manner by continuing to heat the reticulated polyamide formed, in the presence of pyridine hydrochloride mixed directly with the starting products—either a dialkoxyl diamine, a diester and a triester, or the di-isocyanate corresponding to this diamine, a dicarboxylic acid and a tricarboxylic acid—to temperatures which may reach 220° C., in accordance with the method described above.

This method of operation is also very advantageous and particularly economical when the preparation of the reticulated polyamide is effected by poly-condensation in solution. In this case, the solution comprising the starting products—the diamine and the chlorides—and the pyridine as an accepter of hydrochloric acid formed during the course of the poly-condensation reaction, there is obtained directly a reticulated polyamide and pyridine-hydrochloride which, after separating out the solvent by filtration or evaporation, immediately constitute the reaction mixture of the cyclization reaction.

The reticulated polybenzoxazole obtained is produced in the form of a coloured powder. Its infra-red spectrum brings out its constitution of polybenzoxazole by the presence of the characteristic band of benzoxazole at 1650 cm.$^{-1}$.

The reticulated nature of the polymer obtained is made evident by its complete insolubility in all solvents, even in sulphuric acid, whereas the linear polybenzoxazoles are soluble in sulphuric acid.

Reticulated polybenzoxazole is non-meltable and for that reason is very stable under heat. Its thermo-stability is still greater than that of linear polybenzoxazoles, as will appear from the accompanying drawing which is described below, and in which are shown curves of loss of weight in percent of reticulated polybenzoxazole and linear polybenzoxazoles as a function of the temperature.

Its stability under heat, in an oxidizing atmosphere and in a humid atmosphere, is greater than that of linear polybenzoxazoles.

Finally, it also has excellent resistance to attack by chemical products.

Although reticulated polybenzoxazole is non-meltable and insoluble, it is easy to produce shaped objects of reticulated polybenzoxazole by treatment of shaped objects made of reticulated polyamide.

It is also possible to form coatings of reticulated polybenzoxazole by the application on substrata of any kind (metals, mineral products, fabrics of polymer materials, etc.) of a coating of reticulated polyamide which is then converted to a coating of reticulated polybenzoxazole.

The method can be carried into effect as indicated in the examples which are given below by way of indication, without thereby constituting any limitation of the invention.

The single figure of the accompanying drawings shows by way of example, a curve representing the loss in weight by percentages of reticulated polybenzoxazole and linear polybenzoxazoles as a function of the temperature.

EXAMPLE 1

There are placed in a flask 3.7 grams (0.01 mol.) of reticulated methoxyl polyamide obtained by polycondensation in fusion of 2.44 grams (0.01 mol.) of 3,3'-dimethoxy-benidine, 2.86 grams (0.009 mol.) of phenolic diester of isophthalic acid, and 0.29 grams (0.00067 mol.) of phenolic triester of trimesic acid, with 3.9 grams (0.0337 mol.) of pyridine hydrochloride, and heating is carried out for 2 hours with an oil bath brought up to 220° C. The pyridine formed during the course of the reaction is eliminated as it forms by vaporization. After complete elimination of the pyridine, the mixture is again heated to reflux for 1 hour at 220° C. It is then heated for half an hour at 400° C. in order to eliminate the excess of pyridine hydrochloride.

The residue in the tank is formed by 3.1 grams of reticulated polybenzoxazole. The product obtained in accordance with the theoretical yield is produced in the form of powder, insoluble in all solvents, including sulphuric acid, which shows the reticulated nature of the polymer. The absorption band of the infra-red spectrum at 1650 cm.$^{-1}$ indicates that the polymer obtained is a polybenzoxazole.

This polymer has great stability under heat, as is shown by examination of the accompanying figure, in which are represented curves of loss of weight in percentage (percent P) of reticulated polyzenzoxazole as a function of the temperature in ° C. (thermo-gravimetry in air, 3° C./min.). The curves C and $C_1$ concern a test in air. The curve C relates to a linear product and the curve $C_1$ to a 10% reticulated product. The curves C' and $C'_1$ are concerned with a test under nitrogen. The curve C' relates to a linear product and the curve $C'_1$ to a product with 10% reticulation.

EXAMPLE 2

3.7 grams (0.01 mol.) of polyamide obtained by polycondensation of 2.44 grams (0.01 mol.) of 3,3'-dimethoxy-benzidine, 2.86 grams (0.009 mol.) of phenolic diester of isophthalic acid and 0.29 grams (0.00067 mol.) of phenolic triester of trimesic acid are mixed with 2.6 grams (0.0225 mol.) of pyridine hydrochloride and 20 grams of barium sulphate. The mixture is heated to 220° C. and compressed at 1500 kg./sq. cm. for 3 minutes. The moulded part is withdrawn from the mould and is then introduced into an oven brought up to 220° C. The temperature is maintained at 220° C. for 2 hours and is then increased to 300° C. and is kept at this temperature for 15 minutes. The product obtained is a moulded object constituted by reticulated polybenzoxazol and a filling agent, and is insoluble and non-meltable.

EXAMPLE 3

An intimate mixture is made of 6.85 grams (0.0281 mol.) of 3,3'-dimethoxy-benzidine, 7.95 grams (0.025 mol.) of phenolic diester of isophthalic acid, 0.91 gram (0.0021 mol.) of phenolic triester of trimesic acid and 9.75 grams (0.0843 mol.) of pyridine hydrochloride and the mixture is heated to 180° C. for 20 minutes and to 220° C. for 40 minutes in order to effect poly-condensation in fusion. After cooling, the mass is placed in a mould heated to 220° C., after which it is compressed under 500 kg./sq. cm. for 3 minutes. The temperature of 220° C. is maintained for 1 hour, after which it is increased to 350° C. and this temperature is maintained for half an hour. The polymer obtained is produced in the form of an insoluble and non-meltable moulded object.

EXAMPLE 4

6.85 grams (0.0281 mol.) of 3,3'-dimethoxy-benzidine, 7.95 grams (0.025 mol.) of phenolic diester of isophthalic acid. 0.91 gram (0.0021 mol.) of phenolic triester of trimesic acid and 9.75 grams (0.843 mol.) of pyridine hydrochloride of technical quality are mixed with 20 grams of quartz powder and the procedure is followed as described in Example No. 3. The polymer obtained is produced in the form of an insoluble and non-meltable moulded object.

EXAMPLE 5

100 grams of reticulated polyamide powder obtained by poly-condensation in fusion of 50.7 grams (0.208 mol.) of 3,3'-dimethoxy-benzidine, 59.7 grams (0.1875 mol.)

of phenolic diester of terephthalic acid and 5.97 grams (0.0136 mol.) of phenolic triester of trimellic acid are heated with 70 grams (0.61 mol.) of pyridine hydrochloride to the temperatures and for the duration indicated in Example 1. The polymer obtained is a powder which is insoluble in all solvents.

EXAMPLE 6

100 grams of reticulated polyamide powder obtained by poly-condensation in fusion of 50.7 grams (0.208 mol.) of 3,3'-dimethoxy-benzidine, 59.7 grams (0.187 mol.) of phenolic dietser of isophthalic acid and 8.0 grams (0.0136 mol.) of naphtholic triester of trimesic acid are mixed with 70 grams (0.61 mol.) of commercial pyridine hydrochloride and the mixture is heated to the temperatures and for the time indicated in Example 1. The polymer obtained is a powder which is insoluble in all solvents.

EXAMPLE 7

100 grams of reticulated polyamide powder obtained by poly-condensation of 35.4 grams (0.145 mol.) of 3,3'-dimethoxy-benzidine, 31.8 grams (0.10 mol.) of phenolic diester of isophthalic acid and 17.6 grams (0.03 mol.) of naphtholic triester of trimesic acid are mixed with 100 grams (0.87 mol.) of pyridine hydrochloride. The same procedure is followed as described in Example 1. The product obtained is a polymer with a high degree of reticulation.

EXAMPLE 8

29.4 grams (0.12 mol.) of dimethoxy-benzidine are dissolved in a mixture of 32.3 grams of pyridine and 450 ml. of tetra-hydrofuran and the solution formed is cooled to zero ° C. There is then added slowly a solution of 24.5 grams (0.12 mol.) of dichloride of isophthalic acid and 2.5 grams (0.0095 mol.) of trichloride of trimesic acid in 70 ml. of tetra-hydrofuran, and the mixture is left to react for 2 hours. The reaction mixture is precipitated in 500 ml. of benzene. The precipitate obtained—composed of reticulated polyamide and pyridine hydrochloride formed during the reaction of poly-condensation—is then put into a tank and heated to the temperatures and for the time indicated in Example 1. The polymer obtained is insoluble in all solvents.

EXAMPLE 9

10 grams of reticulated polyamide powder obtained by poly-condensation of 8.34 grams (0.028 mol.) of 3,3'-dimethoxy-diphenylene-4,4'-di-isocyanate with 5.01 grams (0.025 mol.) of isophthalic acid and 0.5 gram (0.00207 mol.) of trimesic acid are mixed with 7 grams (0.061 mol.) of pyridine hydrochloride. The mixture is heated to 180° C. for 2 hours, then to 220° C. for 1 hour, then to 300° C. for half an hour in order to expel the excess of pyridine hydrochloride. The polymer obtained is insoluble in all solvents.

EXAMPLE 10

10 grams of polyamide powder obtained by poly-condensation of 8.34 grams (0.028 mol.) of 3,3'-dimethoxy-diphenylene-4,4'-di-isocyanate with 5.01 grams (0.025 mol.) of isophthalic acid and 0.55 gram (0.00207 mol.) of trimesic acid are mixed with 7 grams (0.061 mol.) of pyridine hydrochloride and 50 grams of quartz powder. The mixture is heated to 200° C. and is compressed at 1,000 kg./sq. cm. for 2 minutes. The moulded piece is removed from the mould and is then put into an oven brought up to 300° C.; the temperature is maintained at 200° C. for 2 hours and is then increased to 350° C. which temperature is maintained for 30 minutes. The product obtained is a moulded object constituted by reticulated polybenzoxazole and an insoluble and non-meltable filler.

EXAMPLE 11

8.34 grams (0.028 mol.) of 3,3'-dimethoxyphenylene-4,4'-di-isocyanate is mixed with 5.01 grams (0.025 mol.) of isophthalic acid, 0.55 gram (0.00207 mol.) of trimesic acid, 7.5 grams (0.065 mol.) of pyridine hydrochloride and 20 grams of silica, and the mixture is heated to 180° C. for 30 minutes. The reaction mixture is then placed in a mould, heated to 140° C., and this is compressed at 1,000 kg./sq. cm. for 4 minutes. The moulded product is taken from the mould and then put into an oven heated to 220° C., this temperature being maintained for 2 hours, after which the temperature is increased to 300° C. for 1 hour. The moulded product obtained in a reticulated polybenzoxazole containing a filler.

What we claim is:

1. A method of manufacture of reticulated polybenzoxazole, in which at least one reticulated alkoxyl polyamide and an excess of a member selected from the group consisting of pyridine hydrochloride, picoline hydrochloride, lutidine hydrochloride, and collidine hydrochloride are gradually heated to a temperature between 180° and 220° C. for the time necessary to obtain complete cyclization; said reticulated alkoxyl polyamide consisting essentially of the recurring structural formula

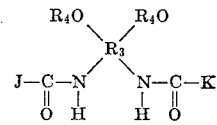

wherein $R_3$ is a tetravalent radical selected from the group consisting of

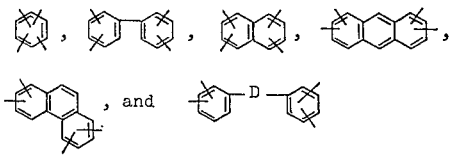

where D is selected from the group consisting of lower alkylene, oxygen, sulfur, —SO$_2$— and

and where each nitrogen atom is attached to a carbon atom of a ring of the aromatic tetravalent radical ortho or para to the carbon atom to which an —OR$_4$ is directly attached; wherein J and K are either of the radicals $R_1$ and $R_2$ wherein $R_1$ is selected from the group consisting of alkylene of 1 to 10 carbon atoms,

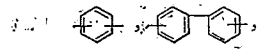

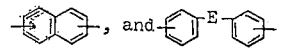

E being selected from the group consisting of alkylene of 1 to 3 carbon atoms, —O—, —S—, and —SO$_2$—, and wherein $R_2$ is selected from the group consisting of

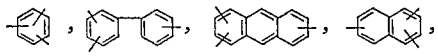

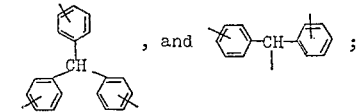

and wherein $R_4$ is an alkyl or aryl radical; the ratio of said trivalent radicals to said divalent radicals being between 1:20 and 1:1; after which the product obtained is heated to a temperature higher than 220° C. in order to eliminate said excess of said member.

2. A method as claimed in claim 1, which said polyamide and said member are heated to a temperature between 180° and 220° C., for a time comprised between 1 hour and 3 hours.

3. A method as claimed in claim 1, in which there is heated at least one mixture of reticulated alkoxyl polyamide and said member in the form of a shaped object.

4. A method as claimed in claim 1, in which there is heated at least one mixture of reticulated alkoxyl polyamide and said member in the form of a shaped object and incorporating a filler.

5. A method as claimed in claim 1, in which at least one reticulated alkoxyl polyamide obtained by poly-condensation of a compound of di-alkoxy diamine, a compound of dicarboxylic acid and a compound of tricarboxylic acid are heated together in the presence of said member.

6. A method as claimed in claim 1, in which said member in pyridine hydrochloride.

7. A method as claimed in claim 2, said last-named time being about 2 hours.

References Cited
UNITED STATES PATENTS

| | | | |
|---|---|---|---|
| 3,316,213 | 4/1967 | Berr | 260—47 |
| 3,332,907 | 7/1967 | Angelo et al. | 260—47 |
| 3,376,257 | 4/1968 | Nakanishi et al. | 260—47 |

WILLIAM H. SHORT, Primary Examiner

L. L. LEE, Assistant Examiner

U.S. Cl. X.R.

260—37 N, 49, 78 TF, 78.4 P, 78.4 E; 264—331